United States Patent [19]
Seifert, Jr.

[11] 3,768,425
[45] Oct. 30, 1973

[54] PRESS WEEDER

[76] Inventor: Edwin A. Seifert, Jr., Rt. 1, Belgrade, Mont.

[22] Filed: Dec. 30, 1971

[21] Appl. No.: 214,109

[52] U.S. Cl. .................. 111/85, 172/44, 172/106, 172/705
[51] Int. Cl. .................. A01c 5/00, A01b 39/19
[58] Field of Search ............. 172/44, 176; 111/52, 111/85

[56] References Cited
UNITED STATES PATENTS

| | | | |
|---|---|---|---|
| 3,140,678 | 7/1964 | Morris | 172/44 X |
| 3,033,135 | 5/1962 | Gavin | 172/44 X |
| 2,614,475 | 10/1952 | Mowbray | 172/44 |
| 2,353,485 | 7/1944 | Miller | 172/44 |
| 3,101,786 | 8/1963 | Hunter et al | 172/44 |

Primary Examiner—Robert E. Pulfrey
Assistant Examiner—Stephen C. Pellegrino
Attorney—Ralph F. Merchant et al.

[57] ABSTRACT

Farming apparatus usable in connection with a seeder for pressing seeds into the ground after they have been dropped in aligned furrows, and for simultaneously weeding the ground between furrows. The apparatus consists of a square rod which is rotatably and horizontally disposed behind furrow-making blades and seed outlets, and which is rotated by an independent drive wheel. The square rod carries a plurality of freely rotating press wheels which are spaced thereon to follow in the furrow and serve to regulate the depth of the square rod. As the seeder moves forward, seeds are dropped into the previously made furrow and pressed into the soil by the freely rotating wheels. Simultaneously, the square rod is rotated by the drive wheel, and the soil between seed rows is turned over to loosen and remove weeds.

18 Claims, 8 Drawing Figures

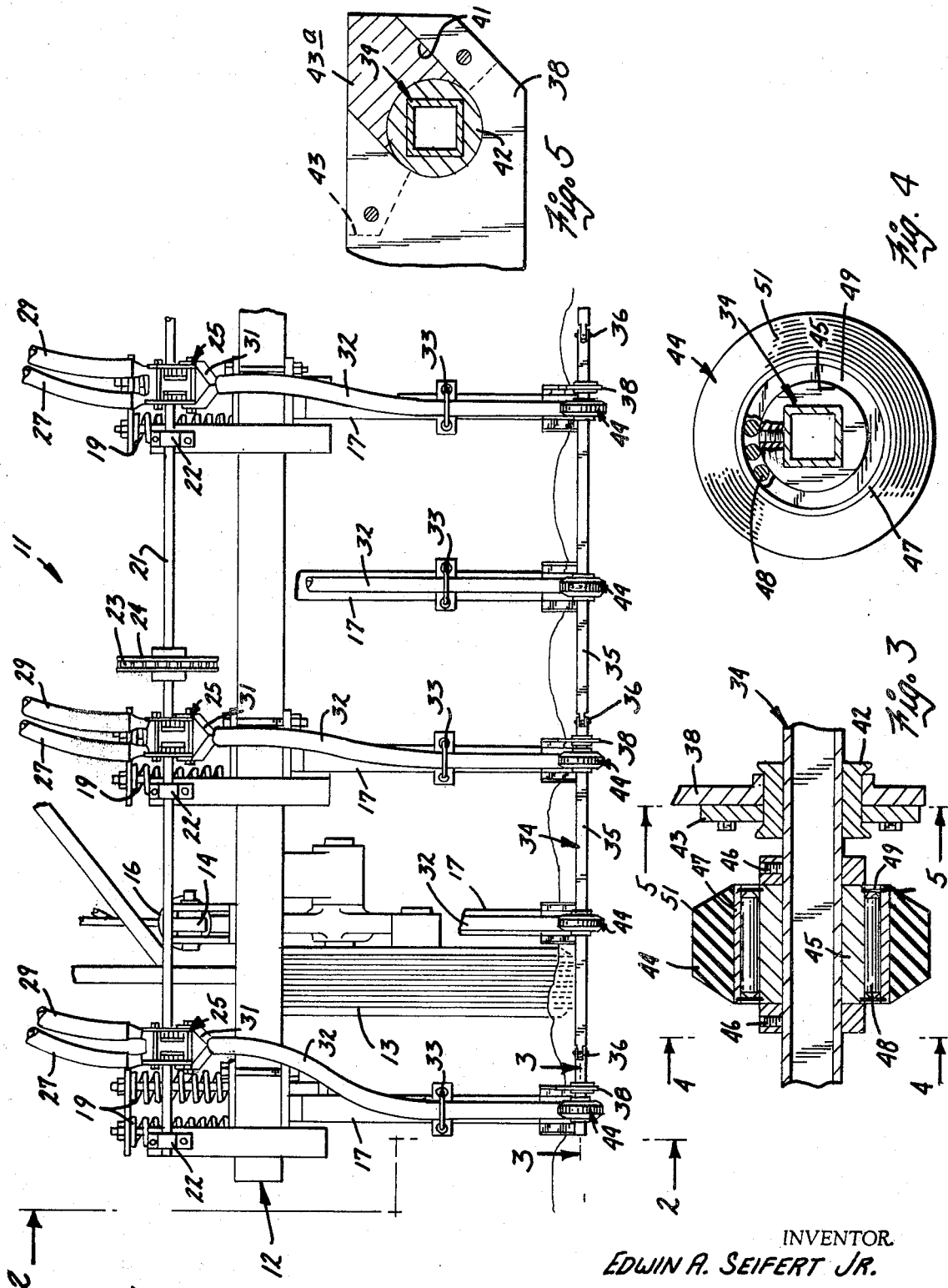

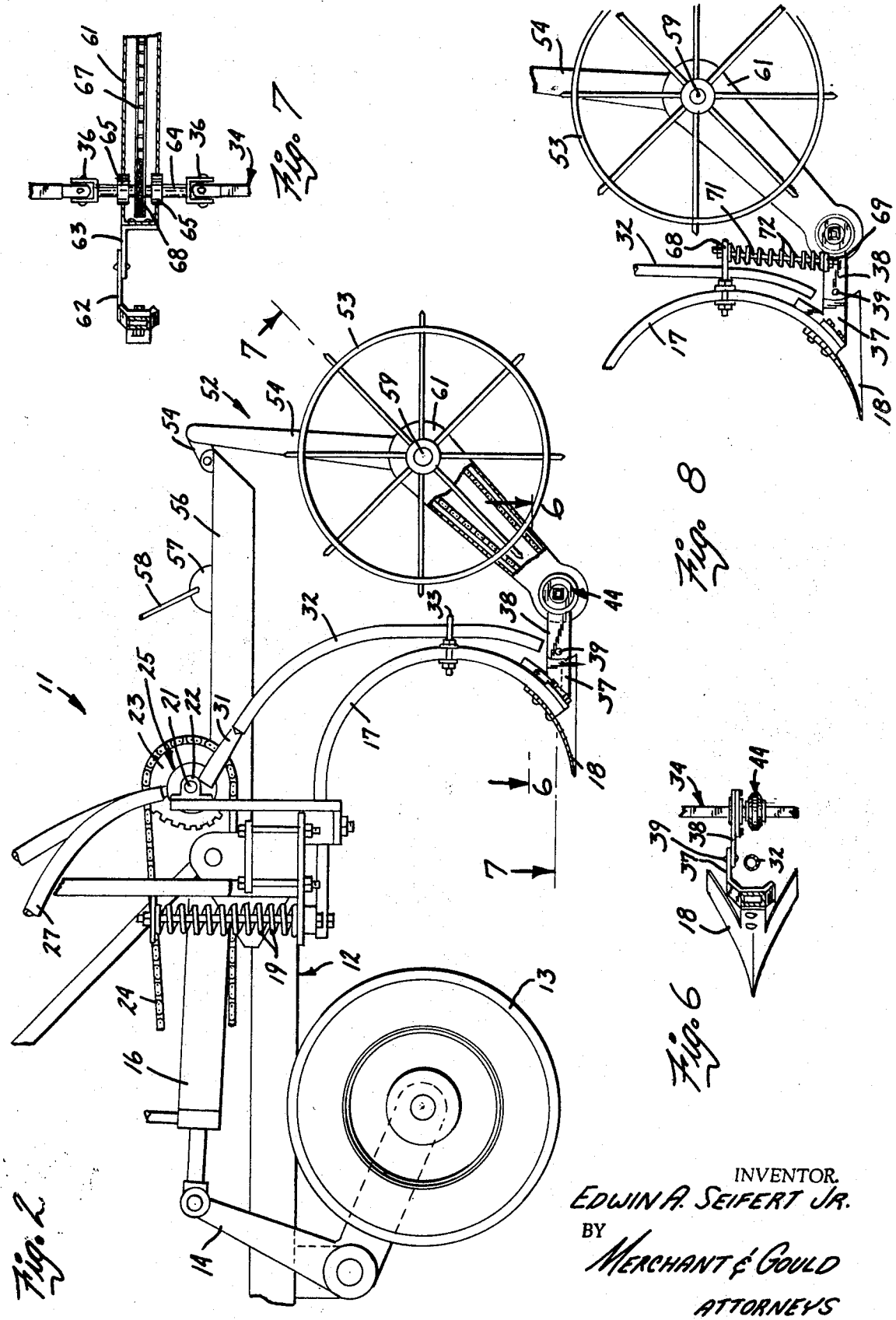

PRESS WEEDER

The invention is generally related to seeding machines, and is specifically directed to apparatus which presses seeds into the soil and simultaneously weeds soil between seed rows.

The planting of agricultural crops involves a number of steps, including formation of a furrow of desired depth, dropping of the seeds in a desired density, fertilizing the seeds and packing soil around the planted seeds. It is also extremely desirable and efficient to weed between the seed rows at the time of seeding.

In my copending patent application entitled "Device for Metering Granular Material," filed May 18, 1971 under Ser. No. 144,436, a framing machine is disclosed which forms a plurality of aligned furrows of desired depth and meters a desired proportion of seeds and granular fertilizer into each furrow, the seeds being dropped at desired intervals in accordance with moving speed of the machine. A metering device is used for each furrow blade, and single hoppers for the seed and fertilizer serve as a common source to the plurality of metering devices. The machine thus efficiently performs the steps of forming the furrow, proportioning seed and fertilizer and metering the mixture in a desired manner, all steps being continuously and simultaneously accomplished with a single machine.

The present invention contemplates apparatus which performs the additional step of covering the seeds with soil and packing the soil around the seeds, and weeding the area between seed rows. The inventive apparatus is disclosed in conjunction with the seed metering device of my earlier application, but it will be appreciated by those skilled in the art that it is suitable for use with any seeding machine which forms aligned furrows and drops seeds into place.

As disclosed, the additional steps of seed pressing or packing and weeding are performed immediately after furrow formation and seeding, with apparatus which forms part of the seeding machine and is operated with its advancing movement. The additional apparatus includes an elongated square rod or shaft (actually comprising a plurality of shaft segments which are universally connected to compensate for terrain irregularities) which is rotatably supported immediately behind the seeding outlets transverse to the direction of machine movement. A plurality of freely rotating press wheels are mounted in spaced relation on the square rod to pass under the surface of soil between seed rows. The square rod is rotated by a separate drive wheel which rolls with the seeding machine, thus causing the soil between seed rows to be turned and weeded as the machine moves forward.

It will be apparent from the disclosure that my inventive apparatus simply and efficiently performs the steps of seed packing and weeding, and is easily adapted for use with seeding machines to accomplish all steps relating to crop seeding with a single machine with a single operation.

BRIEF DESCRIPTION OF THE DRAWINGS

FIG. 1 is a rear elevation of a portion of a seeding machine including inventive apparatus for simultaneously pressing drop seeds into furrows and weeding soil between furrows;

FIG. 2 is a sectional view of the seeding machine taken generally along the line 2—2 of FIG. 1, further showing a drive wheel for operating the inventive apparatus;

FIG. 3 is a sectional view of the inventive apparatus taken along the line 3—3 of FIG. 1;

FIG. 4 is a sectional view taken along the line 4—4 of FIG. 3;

FIG. 5 is a sectional view taken along the line 5—5 of FIG. 3;

FIG. 6 is a sectional view taken along the line 6—6 of FIG. 2;

FIG. 7 is a sectional view taken along the line 7—7 of FIG. 2; and

FIG. 8 is a sectional view similar to that of FIG. 2, disclosing an alternative form of the inventive apparatus.

DESCRIPTION OF THE PREFERRED EMBODIMENT

With initial reference to FIGS. 1 and 2, a seeding machine represented generally by the numeral 11 comprises a frame 12 carried by a plurality of wheels 13, only one of which is shown. Wheel 13 is mounted on one end of a crank member 14, an intermediate portion of which is pivotally connected to a lug 15 forming part of the frame 12. The opposite end of crank member 14 is pivotally connected to a piston-cylinder hydraulic actuator 16, which is also supported by frame 12. The supply of hydraulic fluid to actuator 16 in the known manner operates the crank member 14 to control the position of wheel 13 and thereby raise or lower frame assembly 12.

Clamped to the rear portion of frame 12 is an arcuate member 17, the lower end of which carries a furrow forming blade 18. The upper end of arcuate member 17 is operably connected to a spring 19 which serves to bias the furrowing blade 18 downwardly to form a furrow of desired depth.

Also disposed at the rear of frame 12 is shaft 21 which is rotatably supported by a plurality of bearing housings 22. A sprocket 23 is affixed to shaft 21 and provides rotational movement thereto through a chain 24. The driving member to which chain 24 is connected is not shown, but preferably is capable of providing a range of rotational speeds to the shaft 21. Alternatively, a plurality of different sized sprockets combined with a chain tensioning device could be employed to effect variations in the rotational speed of shaft 21.

Operably mounted on the shaft 21 are a plurality of metering devices represented generally by the numeral 25. Each metering device 25 includes a seed inlet 26 to which a seed tube 27 is attached, a fertilizer inlet 28 to which a fertilizer tube 29 is attached an outlet 31 from which a flexible tube 32 projects to deliver a proportioned mixture of seed and fertilizer to a furrow formed by the blade 18. Tube 32 is held in alignment with blade 18 by a U-bolt 33 carried by the arcuate member 17.

The seed tubes 27 are commonly supplied by a single seed hopper, and the fertilizer tubes 29 are similarly supplied by a fertilizer hopper. Neither hopper is shown. Structure and operation of the metering devices 25 is discussed in detail in the pending application mentioned above. Briefly, however, seed and granular fertilizer are supplied through the tubes 26, 27, respectively, to the device 25 to be proportioned and metered into the outlet tube 32 for discharge into the furrow below. The ratio of seed to fertilizer is individually adjusted within each of the devices 25, and the rate at which the combined mixture is metered into the outlet 32 is governed by rotational speed of the shaft 21. Preferably, shaft 21 rotates as a function of machine movement so that metering of the seed-fertilizer mixture is in accordance with advancing speed of the machine 11.

Disposed immediately behind the discharge tubes 32, and transversely to the line of machine movement, is an elongated shaft or rod. As best shown in FIG. 1, rod 34 consists of a plurality of rod segments 35 joined together by universal connectors 36. For a purpose described below, elongated rod 34 is square in cross-section.

With reference to FIGS. 1, 2 and 6, several of the arcuate members 17 have affixed thereto a bracket consisting of first and second members 37 and 38 pivotally connected at at 39. With additional reference to FIG. 5, the outer end of member 38 includes a slot 41 opening rearwardly which received a spool 42. A square bore is centrally formed in spool 42 to receive and offer rotatable support to the rod 34. A locking plate 43 is bolted to bracket member 38 to retain spool 42 while permitting its rotation. The locking plate 43 has a raised or thickened portion 43a (best shown in FIG. 5) which conforms in size and shape to the slot 41 and closes the slot to preclude the entry of dirt and the like between rotating surfaces.

With reference to FIGS. 1, 3 and 4, a press wheel 44 is carried for free rotation on the shaft 34 in alignment with each of the furrowing blades 18 and discharge tubes 32. Each of the press wheels 44 has an inner race 45 having a square bore formed therein to receive square shaft 34 and a pair of set screws 46 to retain the wheel in place on rod 34. An outer race 47 is rotatably carried on the inner race 45 by a plurality of roller bearings 48. The bearings 48 are protected from dirt and the like on each side by annular seal members 49. The outer race 47 carries a wheel portion 51, preferably formed from rubber. It will be apparent that the construction of press wheel 44 enables it to roll freely when it engages the ground, notwithstanding independent rotation of the shaft 34.

With reference to FIGS. 2 and 7, the numeral 52 generally designates the apparatus for driving rod 34. The apparatus 52 comprises a spike wheel 53 which is rotatably carried by an arm 54. Arm 54 is pivotally mounted, as at 55, on a cantilever support beam 56, which is in turn carried by the frame 12. A lug 57 on the beam 56 receives a cable 58 to raise and lower the entire apparatus as described in further detail below.

The rotatable mounting of spike wheel 53 on arm 54 is by a shaft 59 which rotates with wheel 53. A sprocket (not shown) is carried on the shaft 59 for rotation with wheel 53. An elongated casing 61 housing the sprocket extends downwardly and forwardly to a lower support bracket carried by an arcuate member 17, the bracket consisting of pivotally connected members 62, 63. A circular shaft 64 is journaled in a pair of bearing members 65 at the lower end of casing 61 which is aligned with the aforementioned sprocket and operably connected thereto by a chain 67. One of the rod segments 35 is universally connected to each end of the shaft 64 to complete the drive train.

It will be appreciated that pulling up on the cable 58 (by means not shown) will raise the arm 54, wheel 53, casing 61 and rod 34 about the pivotal connection 39 to an elevated position out of engagement with the soil. Release of the cable 58 enables the entire apparatus to engage the soil below, and forward movement of the machine 11 will cause the wheel 53 to roll and thereby rotate rod 34 with respect to the soil through which it moves.

FIG. 8 discloses structure for continuously exerting a downward biasing force on the rod 34 through each of the pivoted bracket members 38. The biasing apparatus comprises a bracket plate 68 mounted to the arcuate member 17 and a base plate 69 rigidly affixed to the bracket member 38. A rod 71 interconnects the plates 68, 69, and a compression spring 72 is carried on the rod 71 to exert the desired downward biasing force.

In the operation of seeding machine 11, wheel 13 is positioned by the hydraulic actuator 16 to enable blade 18 to form a furrow of desired depth. Forward movement of the machine 11 operates the metering devices 25 to proportion seed and fertilizer from the tubes 27 and 29 and to meter the mixture into the discharge tube 32 for delivery into the furrow below. It will be appreciated that the seed-fertilizer mixture is dropped into the furrow immediately after its formation, and a portion of the dirt diverted to either side of the furrow by the blade 18 (see FIG. 6) will fall back to the furrow after the mixture has been dropped.

With wheel 53 lowered to its operative position, the press wheels 44 ride in the furrows on top of the layer of dirt which has fallen back onto the seed-fertilizer mixture. Thus, the free wheeling press wheels 44 press or pack the seeds into the furrow to permit optimum germination.

Simultaneously, rotation of the spike wheel 53 effects a similar rotation on the square rod 34 to uproot and remove weeds of other undesirable plant life between the furrows, as shown in FIG. 1. The press wheels 44, while packing soil around the planted seeds, also serve to accurately regulate the depth of the square rod weeder 34. Further, the press wheels 44 preserve the formation of furrows while leaving a desired depth of loose soil over the seeds.

Although the press wheels 44 are shown mounted for free rotation on the rod 34 in the preferred embodiment, mounting the press wheels for rotation with the rod is an effective alternative and within the scope of my invention. This could be accomplished by entirely eliminating the bearing between the inner and outer races of the press wheel; or by providing a locking arrangement between the races, in which case the wheel could be used for either locked or free rotation.

It will be appreciated that the combination of press wheels and rod weeder enhance usefulness of a grain seeding machine by performing functions which enable the machine to seed and weed a field with a single machine and with a single operation. Used in conjunction with the metering devices 25 of the earlier copending application, the press wheel-rod weeder not only reduces the time involved in the seeding of a field but also produces optimum results through better control of the seed after it has reached the furrow.

I claim:

1. Apparatus for use with a seeding machine having means for forming a plurality of aligned furrows and means for placing those seeds in said aligned furrows, the apparatus comprising:

a. frame means adapted for connection to a trailing portion of the seeding machine;

b. an elongated rod weeding member of angular cross section rotatably carried by the frame means in a generally horizontal position transverse to the line of seeding machine movement;

c. drive means on said frame members for rotating the rod weeding member;

d. and a plurality of press wheels rotatably mounted on the rod weeding member, each of said press wheels being disposed for alignment with a furrow forming means, and constructed and arranged to roll in a formed furrow in pressing engagement therewith;

e. the radius of each press wheel being less than the furrow depth to permit rotating engagement of the rod weeding member with the soil between furrows as the press wheel engages the furrow bottom.

2. The apparatus defined in claim 1, wherein the elongated rod weeding member is square in cross section.

3. The apparatus defined by claim 1, wherein the elongated rod weeding member comprises a plurality of rod segments flexibly connected to compensate for terrain irregularities.

4. The apparatus defined by claim 3, wherein the plurality of rod segments are universally connected.

5. The apparatus defined by claim 1, wherein each of the press wheels comprises:

a. an inner race affixed to the rod weeding member and rotatable therewith;

b. and an outer race rotatably carried by the inner race.

6. The apparatus defined by claim 5, wherein the outer race is carried on the inner race by a plurality of roller bearings, and further comprising sealing means for protecting the roller bearings from dirt and the like.

7. The apparatus defined by claim 1, wherein the frame means is adapted for pivotal movement with respect to the seeding machine on an axis essentially parallel to the rod weeding member.

8. The apparatus defined by claim 7, wherein the frame means comprises:

a. a plurality of first bracket members each affixed to a furrow forming means;

b. and a plurality of second bracket members each pivotally connected to one of said first bracket members;

c. the rod weeding member being rotatably carried by said plurality of second bracket members.

9. The apparatus defined by claim 8, wherein each of said second bracket members further comprises a rotatable spool member having a central opening conforming to the cross sectional shape of the rod weeding member, the rod weeding member extending through each of said central openings.

10. The apparatus defined by claim 8, and further comprising means for biasing the second bracket member downward.

11. The apparatus defined by claim 1, wherein the drive means comprises:

a. a drive wheel constructed and arranged for engagement with the ground and to be rotated thereby with advancing movement;

b. a first drive member mounted for rotation with the drive wheel;

c. a second drive member mounted for rotation with the rod weeding member;

d. and connection means operably connecting the first and second drive members.

12. The apparatus defined by claim 11, wherein the drive means further comprises a casing enclosing the first and second drive members and the connection means.

13. The apparatus defined by claim 11, wherein the first and second drive members comprise sprockets and the connection means comprises an endless chain.

14. The apparatus defined by claim 1, wherein each of said press wheels is freely rotatable on the rod weeding member.

15. A seeding machine comprising:

a. wheeled frame means;

b. a plurality of furrow blades carried by the frame means in spaced relation to form a plurality of aligned furrows;

c. seeding means carried by the frame means in trailing relation to the furrow blades for placing seeds in formed furrows;

d. an elongated rod weeding member of angular cross section rotatably carried by support means affixed to a plurality of the furrow blades, the rod weeding member being disposed in trailing relation to the seeding means in a generally horizontal position transverse to the line of seeding machine movement;

e. drive means on said frame members for rotating the rod weeding member;

f. and a plurality of press wheels rotatably mounted on the elongated rod weeding member, each of said press wheels being disposed in alignment with one of the furrow blades and constructed and arranged to roll in a formed furrow in pressing engagement tnerewith;

g. the radius of each press wheel being less than the furrow depth to permit rotating engagement of the rod weeding member with the soil between furrows as the press wheel engages the furrow bottom.

16. The apparatus defined by claim 15, wherein the support means is constructed to permit pivotal movement of the rod weeding member with respect to the furrow blades on an axis essentially parallel to the axis of the rod weeding member.

17. The apparatus defined by claim 16, and further comprising means for raising and lowering the rod weeding member about said pivotal axis between position of engagement and nonengagement with the soil.

18. The apparatus defined by claim 15, wherein each of said press wheels is freely rotatable on the rod weeding member.

18. The apparatus defined by claim 15, wherein each ofsaid press wheels is freely rotatable on the rod weeding member.

* * * * *